United States Patent [19]

Chang et al.

[11] Patent Number: 4,645,864

[45] Date of Patent: Feb. 24, 1987

[54] CATALYTIC CONVERSION

[75] Inventors: Clarence D. Chang, Princeton; Joseph N. Miale, Lawrenceville, both of N.J.

[73] Assignee: Mobil Oil Corporation, New York, N.Y.

[21] Appl. No.: 818,968

[22] Filed: Jan. 8, 1986

Related U.S. Application Data

[63] Continuation-in-part of Ser. No. 493,192, May 10, 1983, Pat. No. 4,576,805, which is a continuation-in-part of Ser. No. 412,362, Aug. 27, 1982, abandoned, which is a continuation-in-part of Ser. No. 333,369, Dec. 22, 1981, abandoned.

[51] Int. Cl.$^4$ .................................................. C07C 11/20
[52] U.S. Cl. .................................... 585/408; 585/409; 585/640; 585/733
[58] Field of Search ............... 585/408, 409, 640, 733

[56] References Cited

U.S. PATENT DOCUMENTS

| | | | |
|---|---|---|---|
| 4,538,016 | 8/1985 | Miale et al. | 585/408 |
| 4,564,719 | 1/1986 | Chang et al. | 585/640 |
| 4,567,310 | 1/1986 | Rodewald | 585/408 |
| 4,590,321 | 5/1986 | Chu | 585/408 |

*Primary Examiner*—Curtis R. Davis
*Attorney, Agent, or Firm*—Alexander J. McKillop; Michael G. Gilman; Dennis P. Santini

[57] ABSTRACT

A method for increasing the total amount of lattice metal in the framework of a particular porous inorganic crystalline composition, its conversion to hydrogen or hydronium form and use thereof as a catalyst component having enhanced catalytic activity for conversion of oxygenates to hydrocarbons is provided.

25 Claims, 3 Drawing Figures

CATALYTIC CONVERSION

CROSS-REFERENCE TO RELATED APPLICATION

This application is a continuation-in-part of application Ser. No. 493,192, filed May 10, 1983, now U.S. Pat. No. 4,576,805, which is a continuation-in-part of application Ser. No. 412,362, filed Aug. 27, 1982, now abandoned, which is a continuation-in-part of application Ser. No. 333,369, filed Dec. 22, 1981, now abandoned.

BACKGROUND OF THE INVENTION

1. Field of the Invention

This invention relates to use of a catalyst component prepared by a method for increasing the total amount of lattice metal in the framework of a particular porous inorganic crystalline composition comprising 98 mole percent or more $SiO_2$ and 2 mole percent or less oxides of at least one initial lattice metal selected from those of Groups IIIB, IVB, VB, VIB, VIIB, VIII, IIIA, IVA and VA of the Periodic Table of the Elements. The preparation method comprises contacting the crystalline composition with a particular volatile compound comprising at least one metal to be coordinated in the framework of said crystalline composition, whereby the total amount of lattice metal subsequent to the contacting is greater than the amount of the initial lattice metal prior to the contacting. The volatile compound for use in the catalyst component preparation method comprising the metal for lattice incorporation must have a radius ratio of less than about 0.6 and a size and shape which would permit it to enter the pores of the crystalline composition at the contacting temperature.

The volatile compound contacted inorganic crystalline composition may then be converted to the hydrogen or hydronium form and used as a catalyst component for conversion of organic compounds. More particularly, oxygenates such as alcohols, carbonyls and ethers are converted to hydrocarbons over catalyst comprising the catalyst component prepared by the subject method.

2. Description of Prior Art

High silica-containing zeolites are well known in the art and it is generally accepted that the ion exchange capacity of the crystalline aluminosilicate is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5 (U.S. Pat. No. 3,702,886), ZSM-11 (U.S. Pat. No. 3,709,979), and zeolite ZSM-12 (U.S. Pat. No. 3,832,449) to mention a few.

The silica-to-alumina mole ratio of a given zeolite is often variable; for example, zeolite X can be synthesized with a silica-to-alumina ratio of from 2 to 3; zeolite Y from 3 to about 6. In some zeolites, the upper limit of silica-to-alumina mole ratio is virtually unbounded. Zeolite ZSM-5 is one such material wherein the silica-to-alumina ratio is at least 5. U.S. Pat. No. 3,941,871 discloses a crystalline metal organosilicate essentially free of aluminum and exhibiting an x-ray diffraction pattern characteristic of ZSM-5. U.S. Pat. Nos. 4,061,724; 4,073,865 and 4,104,294 describe microporous crystalline silicas or silicates wherein the aluminum content present is at low levels.

Because of the extremely low aluminum content of these high silica-containing zeolites, their ion exchange capacity is not as great as materials with a higher aluminum content. For instance, the crystalline compositions to be treated hereby will have ion exchange capacity of less than about 0.7 meq/gram, whereas zeolite Y will exhibit an ion exchange capacity of from about 4.32 to about 7.1 meq/gram. Therefore, when the high silica materials are contacted with an acidic solution and thereafter are processed in a conventional manner, they are not as catalytically active as their higher aluminum-containing counterparts.

The novel method of this invention permits the preparation of certain high silica-containing materials which have all the desirable properties inherently possessed by such high silica materials and, yet, have a catalytic activity which heretofore has only been possible to be achieved by materials having a higher aluminum content in their "as synthesized" form.

It is noted that U.S. Pat. Nos. 3,354,078 and 3,644,220 relate to treating certain crystalline aluminosilicates with volatile metal halides. Neither of these latter patents are, however, concerned with treatment of crystalline materials having a high silica/alumina mole ratio and exhibiting a low cation exchange capacity of less than about 0.7 meq/gram. In fact, the methods of these latter patents are critically dependent on the presence of exchangeable cations or exchange capacity in the crystalline aluminosilicate. Also, the latter patents relate to ion exchange of the aluminosilicates having exchangeable cations. The present method relies, instead, upon incorporation of certain elements into a framework.

A number of U.S. patents teach heteroatom feed conversion. Examples of these are U.S. Pat. Nos. 3,894,104, 3,894,106, 3,894,107, 3,899,544, 3,965,205, 4,046,825, 4,156,698 and 4,311,865. Methanol is converted to gasoline in U.S. Pat. Nos. 4,302,619, 3,928,483 and 4,058,576 as examples. Methanol is converted to olefins and/or aromatics in, for example, U.S. Pat. Nos. 3,911,041, 4,025,571, 4,025,572, 4,025,575 and 4,049,735.

SUMMARY OF THE INVENTION

The present invention relates to use of a catalyst component prepared by a novel method for increasing the total amount of lattice metal in the framework of a porous inorganic crystalline composition comprising 98 mole percent or more $SiO_2$ and 2 mole percent or less oxides of at least one initial lattice metal selected from those of Groups IIIB (eg. Sc and Y), IVB (eg. Ti, Zr and Hf), VB (eg. V), VIB (eg. Cr), VIIB (eg. Mn), VIII (eg. Fe, Co and Rh), IIIA (eg. B, Al and Ga), IVA (eg. Ge) and VA (eg. Sb) of the Periodic Table of the Elements and having an anhydrous anionic framework molar composition expressed by the formula $$(1-x)SiO_2 \cdot (x)MO_{n/2}$$

wherein x is less than or equal to 0.02, M is said initial lattice metal and n is the valence of M. The initial lattice metal M may be a combination of metals such as, for example, B and Ga, Co and Al, Co and Cr, Co and Fe, Co and Rh, Fe and Al, Rh and Al, and B and Al. The catalyst component preparation method comprises contacting said crystalline composition at a temperature of from about 100° C. to about 850° C. with a volatile compound comprising at least one metal to be coordinated in the framework of said crystalline composition for a time sufficient to increase the total amount of lattice metal in the framework of said crystalline composition whereby said total amount is greater than the amount of said initial lattice metal prior to said contacting. The volatile compound comprising said metal must have a radius ratio of less than about 0.6 and a size and shape which will permit it to enter the pores of said crystalline composition at the contacting temperature.

The volatile compound contacted inorganic crystalline composition is then converted to the hydrogen or hydronium form.

This application is a continuation-in-part of application Ser. No. 493,192, filed May 10, 1983, which is a continuation-in-part of application Ser. No. 412,362, filed Aug. 27, 1982, which is a continuation-in-part of application Ser. No. 333,369, filed Dec. 22, 1981, the entire contents of each being incorporated herein by reference.

Figure 1:
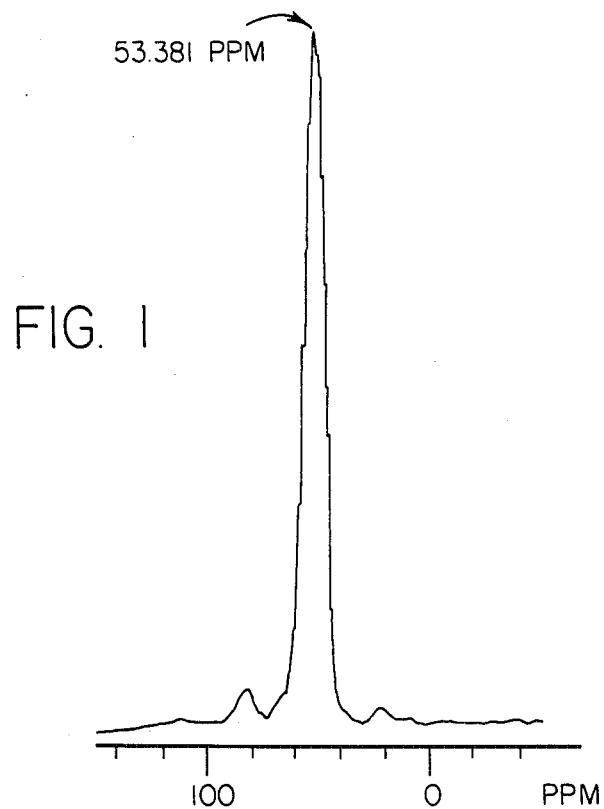
FIG. 1 of the drawings is the solid-state MASNMR spectrum of aluminum in a zeolite ZSM-5 having a silica/alumina mole ratio of 70.

These Figures are discussed in detail in Example 19, hereinafter.

DESCRIPTION OF SPECIFIC EMBODIMENTS

The expression "high silica-containing crystalline material" is intended to define a crystalline structure which comprises 98 mole percent or more $SiO_2$ and 2 mole percent or less oxides of at least one initial lattice metal selected from those of Groups IIIB, IVB, VB, VIB, VIIB, VIII, IIIA, IVA, and VA of the Periodic Table of the Elements and combinations thereof and having an anhydrous anionic framework molar composition expressed by the formula $$(1-x)SiO_2:(x)MO_{n/2}$$

wherein x is less than or equal to 0.02, M is said initial lattice metal and n is the valance of M. M may be, for example, scanadium, yttrium, titanium, zirconium, hafnium, vanadium, chromium, manganese, iron, cobalt, rhodium, boron, aluminum, gallium, germanium, antimony or combinations thereof such as boron-aluminum, chromium-aluminum and iron-aluminum. The silica/initial lattice metal (M) oxide mole ratio may likely be greater than about 100, or greater than about 500, or as close to infinity as practically possible for the crystalline composition to be treated hereby. When M is aluminum, the silica/alumina mole ratio of this crystalline material may be greater than about 100, or greater than about 500, or up to about infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other initial lattice metals associated therewith, such as when M comprises boron, iron, chromium, etc. Thus, a requirement with regard to the starting materials utilized in the novel process of this invention is that they have a silica-to-initial lattice metal oxide mole ratio greater than about 49 (irrespective of what initial lattice metals are present in the crystal structure). The expression also includes crystalline materials which originally contained sufficient initial lattice metal, eg. aluminum, to have a silica-to-initial lattice metal oxide (eg. alumina) mole ratio less than 49, but which were demetalized, eg. dealuminized, to have such ratio above 49.

The high silica materials for advantageous treatment by the present method are those having virtually no exchange capacity, i.e. a total cation exchange capacity of less than about 0.7 meq/gram of material, and most advantageously less than about 0.1 meq/gram. An observable total cation exchange capacity of 0 meq/gram of the high silica material will be acceptable. It is noted that, by way of comparison, the total cation exchange capacity of synthetic faujasite, such as zeolite Y, having a silica/alumina mole ratio of 5.6, on the same basis is about 4.56 meq/gram.

The new catalyst component preparation method disclosed herein is different in kind from ion exchange. Those skilled in the art will recognize upon viewing the results herein presented that the present method does not require the presence of exchangeable cations associated with the crystalline composition starting material, as ion exchange clearly does. A crystalline zeolite structure with negligible ion exchange capacity, ie. the starting material for the present method, can now be activated or metallated and the activated or metallated crystal shows enhanced exchange capacity, and in the case of an aluminim activated, ie. aluminum incorporated, material when in the hydrogen form, the resultant crystal shows enhanced catalytic activity for n-hexane cracking as measured by the Alpha Test, hereafter defined.

Ion exchange, i.e., replacement of exchangeable cations of a crystalline composition with other cations by the methods taught or suggested in U.S. Pat. Nos. 3,354,078 and 3,644,220, and metal incorporation into a crystalline composition structure are competing mechanisms when the crystal is contacted with a solution containing metal ions. This phenomenon was recognized and utilized in the present method in that as the silica/initial lattice metal, eg. aluminum, oxide mole ratio increases to a high value, ion exchange capacity of that material diminishes and ion exchange subsides to the flourishing benefit of metal incorporation under the conditions hereof. This is evident for the examples hereinafter presented.

The starting materials utilized in the catalyst component preparation method may be synthesized from reaction mixtures containing various ion sources, including bulky ion sources. It is necessary that the volatile inorganic reagent have access to the intracrystalline volume or space of the crystalline material being treated, and, while not wishing to be bound by any theory of operation, it is though that use of a bulky ion source in synthesis of certain starting crystalline materials may aid in generating such materials having larger intracrystalline space and pore openings, thereby providing greater access for the volatile inorganic reagent.

Bulky ion sources useful in the synthesis of some starting material to be utilized herein include, but are not limited to, onium compounds and compounds containing multiple cationic centers. Onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

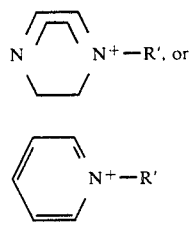

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

Compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

[(CH$_3$)$_3$As$^+$(CH$_2$)$_6$N$^+$(CH$_3$)$_3$](Cl$^-$)$_2$,

[(C$_3$H$_7$)$_3$N$^+$(CH$_2$)$_{10}$N$^+$(C$_3$H$_7$)$_3$](Cl$^-$)$_2$,

[(C$_6$H$_5$)$_3$N$^+$(C$_2$H$_4$)$_{16}$P$^+$(C$_6$H$_5$)$_3$](OH$^-$)$_2$,

[(C$_{18}$H$_{37}$)$_3$P$^+$(C$_2$H$_2$)$_3$P$^+$(CH$_3$)$_3$](Cl$^-$)$_2$,

[(C$_2$H$_5$)$_3$N$^+$(C$_6$H$_4$)N$^+$(C$_2$H$_5$)$_3$](Br$^-$)$_2$,

[(CH$_3$)$_3$Sb$^+$(CH$_2$)$_{10}$Sb$^+$(CH$_3$)$_3$](Cl$^-$)$_2$,

[(C$_6$H$_5$)$_3$Sb$^+$(CH$_2$)$_4$N$^+$(CH$_3$)$_3$](OH$^-$)$_2$,

-continued

[(CH$_3$)$_3$Bi$^+$(CH$_2$)$_{18}$N$^+$(CH$_3$)$_3$](Br$^-$)$_2$,

[(C$_2$H$_3$)$_3$N$^+$(CH$_2$)$_{50}$N$^+$(C$_2$H$_3$)$_3$](OH$^-$)$_2$,

[(C$_6$H$_5$)$_3$P$^+$(C$_2$H$_2$)$_6$As$^+$(CH$_3$)$_3$](Cl$^-$)$_2$,

[(CH$_3$)$_3$N$^+$(CH$_2$)$_6$N$^+$(CH$_3$)$_3$](Cl$^-$)$_2$, and

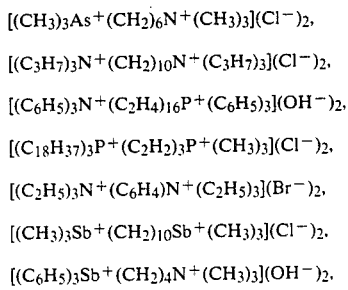

The size of the volatile compound should be comparable to or smaller than the critical pore dimension of the crystalline composition in order to enter into the pores of the crystal and be in a location suitable for lattice incorporation. Therefore, it is believed that the volatile compound must have a critical size and shape at the contacting temperature comparable to or less than the critical pore dimension of the crystal at that temperature. The "critical pore dimension" is the pore dimension which would limit sorption of the volatile compound at the contacting temperature. It is the kinetic diameter of a circular pore and, it is about the minor axis size of an elliptical pore. However, it is not inconceivable that a bulky volatile compound reagent may, upon contact with the exterior surface of the crystalline composition, be transformed into smaller species which enter the pores with greater facility. A putative example may be Al$_2$Cl$_6$(gas)⇌2AlCl$_3$(sorbate).

The catalyst component preparation method is simple and easy to carry out although the results therefrom are dramatic. It is carried out by subjecting a calcined high silica crystalline material satisfying the above description to contact with a volatile compound having a radius ratio of less than about 0.6, preferably from greater than about 0.1 to less than about 0.6, and a size and shape which would permit it to enter the pores of the high silica crystalline material, at a temperature of from about 100° C. to about 850° C., preferably from about 100° C. to about 500° C.

The volatile compound contacted material will then be converted to the acid form, i.e. the hydrogen or hydronium form. This may be accomplished by hydrolysis followed by calcination, by contact with an ammonium salt or acid solution followed by calcination or, if the crystalline material contains hydrogen precursor material by way of its synthesis, by calcination.

Without wishing to be bound by any theory of operation, it is believed that the central atom of the volatile compound, e.g. aluminum in aluminum chloride, actually enters the high silica crystalline material framework by coordination, tetrahedral or otherwise, with lattice defects. Central to this hypothesis is the assumed presence of lattice defects or "hydroxyl nests" (R. M. Barrer et al, Can. J. Chem. 42, 1964, p. 1481) which can accommodate the reactant volatile compound central atom.

The volatile compound contacting step may be accomplished by admixture of the volatile compound reagent with an inert gas such as nitrogen or helium at temperatures ranging from about 100° C. to about 850° C., preferably from about 100° C. to about 500° C. The amount of reagent compound vapor which is utilized is not narrowly critical but usually from about 0.2 to about 2 grams of volatile compound are used per gram of high silica crystalline starting material. In any event, the contacting is conducted in an anhydrous system, eg. the vapors of the reagent compound are dry.

The volatile compound for use herein will exhibit a radius ratio of less than about 0.6, preferably from greater than about 0.1 to less than about 0.6. The term "radius ratio" is defined by L. Pauling in *The Nature of the Chemical Bond*, Third Edition, Cornell University Press, 1960, Chapter 13, pages 505 et seq, incorporated herein by reference as to definition of radius ratio, for inorganic compounds. The radius ratio for the volatile compound used herein is:

$$\text{radius ratio} = \frac{\text{crystal ionic radius of the metal atom of the volatile compound}}{\text{crystal ionic radius of the oxygen anion, } O^{-2}}$$

The metal of the volatile compound must be small enough in ionic state to easily fit into the tetrahedral lattice location. It is believed that a compound having a radius ratio of less than 0.6 will provide the metal in its ionic state in a size which will easily fit. Therefore, a volatile compound having a radius ratio of less than 0.6 will be useful for increasing the content of coordinated, tetrahedrally or otherwise, lattice metal in the framework of an inorganic porous crystalline composition satisfying the above description, such as ZSM-5.

The crystal ionic radii of elements are listed in the *CRC Handbook of Chemistry and Physics*, 61st Edition, CRC Press, Inc., 1980, pages F-216 and F-217, said listing incorporated herein by reference. In determining the radius ratio of a particular compound, it is necessary to use crystal ionic radii of the central atom therein (e.g. aluminum in aluminum chloride) and the oxygen anion (e.g. $O^{-2}$) which have been measured by the same method. Non-limiting examples of inorganic compounds satisfying the radius ratio limitation of 0.6, along with their radius ratio in parenthesis, include the following:

$AlBr_3$ (0.386)
$AlCl_3$ (0.386)
$BCl_3$ (0.174)
$FeCl_3$ (0.485)
$CrO_2Cl_2$ (0.394)
$PCl_3$ (0.333)
$TiCl_4$ (0.515)
$SnCl_4$ (0.538)
$GaCl_3$ (0.470)

Inorganic compounds not useful in the present method since their radius ratios fail to satisfy the radiaus ratio limitation of 0.6 include, for example, $UF_6$ (0.606), $SnCl_2$ (0.704), $CrCl_2$ (0.674), $TiCl_2$ (0.712), $SrCl_2$ (0.848) and $CeCl_3$ (0.783).

The compound for use herein will also be one which is volatile within the temperature range of from about 100° C. to about 850° C. It will likely have a vapor pressure of greater than about 10 mm at a temperature of about 400° C.

Non-limiting examples of compounds satisfying the 0.6 radius ratio and volatility limitations hereof include inorganic halides, eg. chlorides and bromides, having a central atom selected from the group consisting of $Al^{+3}$, $B^{+3}$, $Be^{+2}$, $Co^{+2}$, $Cr^6$, $Fe^{+3}$, $Ga^{+3}$, $Ta^{+5}$, $Mn^{+4}$, $Mo^{+6}$, $P^{+3}$, $Sb^{+3}$, $Sn^{+4}$, $Ti^{+4}$, $V^{+5}$, $W^{+6}$ and $Zr^{+4}$.

The conversion of the volatile compound contacted material to acid form, i.e. hydrogen or hydronium form, may be accomplished in one of several ways. It may be accomplished by contact with an ammonium salt or acid solution followed by calcination at a temperature of from about 200° C. to about 600° C. in an inert atmosphere of air, nitrogen, etc. at subatmospheric, atmospheric or superatmospheric pressure for from about 1 minute to about 48 hours. The ammonium salt solution and acid solution may be aqueous in concentrations of from about 0.01N to about 1N ammonium salt and from about 0.01N to about 0.5N acid. The contact time will be from about 1 hour to about 20 hours at a temperature of from ambient to about 100° C. The ammonium salt used is not narrowly critical and will normally be an inorganic salt such as ammonium nitrate, ammonium sulfate, ammonium chloride, etc. The acid used will normally be an organic or inorganic acid such as acetic acid, hydrochloric acid, nitric acid, etc.

The conversion of the volatile compound contacted material to acid form may also be accomplished by hydrolysis, such as by contact with water at a temperature of from about 20° C. to about 550° C., followed by calcination as above. When the hydrolyzing temperature is below 100° C. at atmospheric pressure, liquid water may be used. When the boiling point of water is exceeded, such as when the hydrolyzing temperature exceeds 100° C. at atmospheric pressure, the crystalline material may be purged with water saturated gas, e.g. helium. Of course, hydrolysis and aluminum salt solution or acid solution contacting may be conducted simultaneously when the salt or acid solution is aqueous.

The conversion to acid form may also be accomplished if the crystalline material was synthesized with a hydrogen precursor reaction mixture component present, by calcination of the volatile compound contacted material at a temperature of from about 200° C. to about 600° C. in an inert atmosphere of air, nitrogen, etc. at subatmospheric, atmospheric or superatmospheric pressure for from about 1 minute to about 48 hours.

Of the high silica zeolite materials advantageously treated in accordance herewith, zeolites having the structure of ZSM-5, ZSM-11, ZSM-5/ZSM-11 intermediate, ZSM-48, dealuminized ZSM-20, dealuminized zeolite Y or zeolite Beta are particularly noted. ZSM-5 is described in U.S. Pat. Nos. 3,702,886 and Re. 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate zeolite is described in U.S. Pat. No. 4,229,424, incorporated herein in its entirety by reference.

ZSM-48 is described in U.S. Pat. No. 4,375,573, the entire contents of which is incorporated herein by reference. Zeolite Beta is described in U.S. Pat. Nos. 3,308,069 and Re. 28,341, the entire contents of each being incorporated herein by reference. Preparing said zeolite Beta with a silica/alumina mole ratio above the 100 to 150 maximum specified in U.S. Pat. Nos. 3,308,069 and Re. 28,341 may be accomplished by extraction with acid.

Zeolite Y can be synthesized only in forms which have silica/alumina ratios up to about 5 and in order to achieve higher ratios, resort may be made to various techniques to remove structural aluminum so as to obtain a more highly siliceous zeolite. Zeolite ZSM-20 may be directly synthesized with silica/alumina ratios of 7 or higher, typically in the range of 7 to 10, as described in U.S. Pat. Nos. 3,972,983 and 4,021,331, the entire contents of each being incorporated herein by reference.

A number of different methods are known for increasing the structural silica/alumina mole ratio of various zeolites such as ZSM-20, Beta and Y. Many of these methods rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr, American Chemical Society, 1973. Specific methods for preparing dealuminized zeolites are described in the following, which are incorporated by reference herein for details of the methods: Catalysis by Zeolites (International Symposium on Zeolites, Lyon, Sept. 9–11, 1980), Elsevier Scientific Publishing Co., Amsterdam, 1980 (dealuminization of zeolite Y with silicon tetrachloride); U.S. Pat. No. 3,442,795 and G.B. Pat. No. 1,058,188 (hydrolysis and removal of aluminum by chelation); G.B. Pat. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halides and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); Japan Pat. No. 53,101,003 (treatment with EDTA or other materials to remove aluminum) and J. Catalysis 54 295 (1978) (hydrothermal treatment followed by acid extraction).

Highly siliceous forms of zeolite having the structure of zeolite Y may be prepared by steaming or by acid extraction of structural aluminum (or both) but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication, Society of Chemical Engineering (London) Monograph Molecular Sieves, page 186 (1968) by C. V. McDaniel and P. K. Maher, and incorporation herein by reference is made to these for details of the zeolite and its preparation. In general, "ultrastable" refers to Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent, and a unit cell size less than 24.5 Angstroms and a silica/alumina mole ratio in the range of 3.5 to 7 or higher. The ultrastable form of Y-type zeolite is obtained primarily by a substantial reduction of the alkali metal ions and the unit cell size. The ultrastable zeolite is identified both by the smaller unit cell and the low alkali metal content in the crystal structure.

Other specific methods for increasing the silica/alumina mole ratio of zeolite Y by acid extraction are described in U.S. Pat. Nos. 4,218,307, 3,591,488 and 3,691,099, incorporated herein by reference for details of these methods.

Zeolite ZSM-20 may be converted to more highly siliceous forms by a process similar to that used for zeolite Y. First, the zeolite may be converted to an "ultrastable" form which is then dealuminized by acid extraction. The conversion to the ultrastable form may suitably be carried out by the same sequence of steps used for preparing ultrastable Y. The zeolite is successively base-exchanged to the ammonium form and calcined, normally at temperatures above 700° C. The calcination should be carried out in a deep bed in order to impede removal of gaseous products. Acid extraction of the "ultrastable" ZSM-20 may be effected in the same way as mentioned above for zeolite Beta.

The feedstock to the present process may comprise lower aliphatic alcohols, carbonyls, ethers or mixtures thereof. Feedstock alcohols will be aliphatic alcohols of from 1 to about 6 carbon atoms, preferably from 1 to 3 carbon atoms, e.g., methanol and ethanol. Feedstock carbonyls will be lower aliphatic carbonyls, such as, for example, acetone. Feedstock ethers will be lower aliphatic ethers of up to about 6 carbon atoms, e.g., from 2 to about 6 carbon atoms, such as dimethylether, n-propyl ether, p-dioxane, trioxane and hexose.

The product of this process when alcohols, carbonyls or ethers are converted will be predominantly hydrocarbons including olefins of from 2 to 5 or more carbon atoms with $C_2$ olefins usually less than about 10% of the total and $C_5^+$ olefins usually less than about 15% of the total. Aromatic hydrocarbons, such as durene, are also produced. $C_3$ and $C_4$ olefins are desired chemical products, and $C_5^+$ products are valuable as gasoline components.

Reaction conditions for the conversion of alcohols, carbonyls, ethers or mixtures thereof to hydrocarbons, e.g., olefins, and hydrocarbons including aromatics, e.g., gasoline components, include a temperature of from about 275° C. to about 600° C., a pressure of from about 0.5 atmosphere to about 50 atmospheres and a liquid hourly space velocity of from about 0.5 $hr^{-1}$ to about 100 $hr^{-1}$.

In practicing a particularly desired chemical conversion process, it may be useful to incorporate the above-described activity enhanced crystalline material with a matrix comprising another material resistant to the temperature and other conditions employed in the process. Such matrix material is useful as a binder and imparts greater resistance to the catalyst for the severe temperature, pressure and reactant feed stream velocity conditions encountered in, for example, many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

The following examples will illustrate the novel process of the present invention.

EXAMPLE 1

A high silica-containing ZSM-5 prepared as in U.S. Pat. No. 3,702,886 from a reaction mixture containing tetraalkylammonium ions and having a silica/alumina mole ratio of about 26,0000:1 was treated with 1N $NH_4NO_3$, washed with water and treated with 0.5N $HNO_3$ and then washed with water again and calcined in air for 30 minutes at 538° C. The final product was a HNaZSM-5 comprising 92 ppm bulk alumina and 210 ppm sodium, having a total cation exchange capacity evaluated in terms of ammonia desorption in meq N/gram of material by way of thermogravimetric analysis of less than 0.008 meq/gram.

EXAMPLE 2

A 5.5 gram sample of the calcined crystalline material from Example 1 was placed in the center of a 1.8 cm I.D.×25 cm vycor tube. One end of the tube was filled with anhydrous inorganic halide (about 3.5 grams of $AlCl_3$) having a radius ratio of 0.386. A 4-way stopcock was used to direct a helium flow to either end, through the tube and to vent. A pipe furnace long enough to cover ⅔ of the tube length was used as a heat source. The crystalline material was heated to 375° C. with He flow through the inorganic halide, unused inorganic halide collecting on the cold downstream end. The critical size and shape of the anhydrous $AlCl_3$ at 375° C. is such that it enters the pores of the crystalline material at that temperature. The flow was reversed after 1 hour and the furnace was moved to cover the condensed inorganic halide. Cold air was used to chill the down stream end. The system was subjected to 12 hourly flow changes or cycles. At the end of every third cycle, the temperature was raised to 550° C. for 30 minutes. The product was exchanged twice with 1N $NH_4NO_3$ and calcined overnight in air at 538° C.

EXAMPLE 3

A 0.5 gram quantity of the calcined crystalline material from Example 1 was exchanged twice with 1N $NH_4NO_3$ and calcined in air for 16 hours at 538° C.

EXAMPLE 4

The ammonium exchanged material from Example 3 and fully treated material from Example 2 were examined for total cation exchange capacity and catalytic activity. These values were also determined for the material from Example 1 for comparison purposes. The exchange capacity was evaluated in terms of ammonia desorption in meqN/gram of material by way of thermogravimetric analysis. The catalytic acivity was evaluated in terms of Alpha Value which is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016). The Alpha Test is described in U.S. Pat. No. 3,354,078 and in The Journal of Catalysts, Vol. IV, pp. 522–529 (August 1965), the contents of each being incorporated herein by reference as to said description. The relationship of Alpha Value to the intrinsic rate constants of other acid-catalyzed reactions is detailed in Nature, Vol. 309, pp. 589–591, June 14, 1984, incorporated herein by reference as to that detail.

The results of these examinations are listed below. The improvement by way of the present method is evident, showing activation of a material having no appreciable cation exchangeability. The observed increase in exchange capacity for the material treated by the present method is evidence of aluminum incorporation. The substantial enhancement in Alpha activity suggests that the aluminum of the inorganic halide has entered the crystalline material framework as tetrahedral aluminum.

| Crystalline Material | Example 1 | Example 2 | Example 3 |
|---|---|---|---|
| Cation Exchange Capacity, meq/gram | less than 0.008 | 0.0564 | less than 0.008 |
| Alpha Value | about 0.1 | 100 | about 0.15 |
| $SiO_2/Al_2O_3$, molar | 26,000 | less than 590 (estimated) | 26,000 |

EXAMPLE 5

(A) A high silica-containing ZSM-5 prepared as in U.S. Pat. No. 3,702,886 from a reaction mixture containing tetraalkylammonium ions and having a silica-to-alumina mole ratio of about 26,000:1 (65 ppm framework alumina, 110 ppm bulk alumina and 0.23 percent sodium) was calcined in air for 30 minutes at 538° C. This material had a total cation exchange capacity of virtually 0 meq/gram.

(B) A high silica-containing ZSM-5 prepared as in U.S. Pat. No. 3,702,886 from a reaction mixture containing tetraalkylammonium ions and having a silica-to-alumina mole ratio of about 600:1 was calcined for 30 minutes in air at 538° C. This material had a total cation exchange capacity of 0.055 meq/gram.

EXAMPLE 6

A vycor tube was loaded with 2 grams anhydrous $AlBr_3$ having a radius ratio of 0.386 and 4 grams of the product of Example 5(A), separating the components with a thin plug of vycor wool. A stream of helium (about 100 ml/minute) was passed through the $AlBr_3$ and then through the crystalline material. The temperature was increased to 100° C. for one hour and then at 5° C./minute to 370° C. The reactor tube was tilted about 30 degrees to retain any liquid $AlBr_3$ near the inlet. After 30 minutes at 370° C., the reactor tube was removed, cooled, and sealed at room temperature overnight. The reactor tube was again heated with the helium flow to 500° C. for one hour. The critical size and shape of the anhydrous $AlBr_3$ at 370° C. is such that it enters the pores of the crystalline material at that temperature.

EXAMPLE 7

An aliquot of the product of Example 6 was hydrolyzed by treating with water at room temperature three times for 45 minutes each. The resulting hydrolyzed crystalline material was calcined in flowing air for 30 minutes at 538° C.

EXAMPLE 8

An aliquot of the product of Example 6 was hydrolyzed by purging at 200°–550° C. with water saturated helium (45°–50° C., 80–90 mm $H_2O$) and then calcined in flowing air from 30 minutes at 538° C.

EXAMPLE 9

An aliquot of the product of Example 6 was base-exchanged with an aqueous solution of 1N $NH_4NO_3$ (3-exchanges followed by hot water washing). The resulting exchanged crystalline material was calcined for 30 minutes at 538° C. in flowing air.

EXAMPLE 10

The product zeolites of Examples 5(A), 7, 8 and 9 were evaluated for catalytic activity by the Alpha Test. The results of these tests are below:

| Crystalline Product of Example Number | Alpha Value |
|---|---|
| 5(A) (basis) | 0.015 |
| 7 | 50 |
| 8 | 29 |
| 9 | 71 |

EXAMPLE 11

An aliquot of the product of Example 5(B) was treated with anhydrous $AlBr_3$ as in Example 6 except that nitrogen was used instead of helium and the temperature was maintained at 130° C. for overnight. The resulting crystalline material was calcined in air at 538° C. overnight and then base-exchanged with 1N $NH_4NO_3$ aqueous solution. The exchanged material was then calcined for 30 minutes at 538° C. in flowing air.

EXAMPLE 12

An aliquot of the product of Example 5(B) was calcined overnight in air at 538° C., then base-exchanged with an aqueous solution of 1N $NH_4NO_3$, and then calcined for 30 minutes at 538° C. in flowing air. The product of this example was not contacted with the inorganic halide, i.e. aluminum bromide, as was the case for Example 11.

EXAMPLE 13

The product zeolites of Examples 11 and 12 were evaluated for catalytic activity as in Example 10 and for structural aluminum and silicon contents. The results are listed below:

| | Crystalline Product of Example Number | |
|---|---|---|
| | 11 | 12 |
| Alpha Value | 15 | 10 |
| Aluminum Content, % wt. | 1.24 | 0.16 |
| Silicon Content, % wt. | 46.45 | 46.77 |

EXAMPLE 14

In order to demonstrate relative importance of converting the inorganic halide contacted material to the hydrogen or hydronium form, a 3 gram aliquot of the high silica-containing ZSM-5 prepared in Example 5(A) was placed in one side of a glass reactor and 1.5 grams of anhydrous $AlCl_3$ in the other. The materials were flushed at 100° C. with helium flowing at 50 ml/minute. The aluminum chloride was carried through the bed of ZSM-5 while heating to 200° C. at about 2° C. per minute, to 500° C. at about 5° C. per minute and maintaining the reactor at 500° C. for 30 minutes. The zeolite was placed in a clean reactor and flushed with helium at 500° C. for 30 minutes to remove any unreacted aluminum chloride. Half the product was then hydrolyzed by standing in 100 ml water at room temperature for two hours. It was then decanted and dried overnight at 130° C. Both halves were then calcined in air at 538° C. for 30 minutes. Both the hydrolyzed and unhydrolyzed halves were tested for n-hexane cracking by the Alpha Test. The results of these tests are listed below with results of the same tests for the ZSM-5 treated in accordance herewith, i.e. Example 9, for comparison. The improvement is evident.

| Crystalline Product of Example Number | Alpha Value |
|---|---|
| 5(A) (basis) | 0.015 |
| 9 | 71 |
| 14 (unhydrolyzed) | 0.6 |
| 14 (hydrolyzed) | 32 |

EXAMPLE 15

A dealuminized zeolite Y having a silica/alumina mole ratio of 278 was prepared from $NH_4NaY$ with a silica-to-alumina mole ratio of 5 by a series of $NH_4^+$ exchange/calcinations followed by a series of acid extractions with increasing acid strength. The dealuminized zeolite Y exhibited negligible total cation exchange capacity (i.e. about 0 meq/gram), and an Alpha Value of between 0.4 and 0.7. An aliquot of the dealuminized zeolite Y was treated as in Example 2 (aluminum chloride being the volatile compound) and tested for exchange capacity and Alpha Value as in Example 4. The final material had a total cation exchange capacity of 0.575 meq/gram and an Alpha Value of 18.

The observed increase in exchange capacity for the dealuminized Y, as well as the zeolite ZSM-5 of Example 2, is evidence of metal, ie. aluminum, incorporation by the present method. Again, the substantial enhancement in Alpha activity suggests that the metal has entered the zeolite framework, in this instance as tetrahedral aluminum.

In the treatment of dealuminized zeolite Y, the activity enhancement is relatively lower than that for zeolite ZSM-5. This is believed explained in light of the Kerr mechanism (G. T. Kerr, ACS Adv. Chem. Ser. No. 121, 1974, p. 219) for ultrastabilization of dealuminized Y. According to this mechanism, the vacancies generated by aluminum removal from faujasites tend to "heal" by incorporation of extra-framework $Si(OH)_4$. Defect sites available for tetrahedral coordination will therefore be limited in dealuminized Y. Therefore, it may be inferred from the large enhancement in exchange capacity observed in Example 15 that a significant fraction of the aluminum added by way of the volatile compound is incompletely coordinated in the lattice, or possibly present as occluded silica-alumina in the dealuminized zeolite Y. This is consistent with the hypothesis that lattice defects are implicated in the present method for activity enhancement of high silica crystalline materials having negligible cation exchange capacity with inorganic halides.

EXAMPLE 16

A crystalline zeolite Beta preparation with a silica/alumina mole ratio of 176 and a cation exchange capacity of only about 0.19 meq/gram is calcined for 30 minutes at 538° C. A 3 gram aliquot is placed in one half of a vycor reactor and 2 grams of ferric chloride (radius ratio of 0.485) in the other. The system is heated slowly at about 2° C. per minute to 550° C. Ferric chloride has a size and shape at 550° C. such that it enters the pores of zeolite Beta. The reactor is tipped about 15° C. from the horizontal so that flowing helium (100 ml/min) is passed through the molten or boiling ferric chloride, and then through the zeolite bed. The crystalline zeolite Beta is then purged at 550° C. for 30 minutes and cooled. It is then exchanged with 1N $NH_4NO_3$, calcined in air at 538° C. for 16 hours, and tested for catalytic activity along with the untreated zeolite Beta in the Alpha test. The results of this test are below:

| Crystalline Material | Alpha Value |
|---|---|
| Untreated Zeolite Beta Used in Example 16 | 68 |
| Treated Zeolite Beta of Example 16 | est. 85 |

EXAMPLE 17

A crystalline "borosilicate" having the structure of zeolite Beta and a silica/alumina mole ratio of 145, a silica/boria mole ratio of 29.6 and a cation exchange capacity of approximately 0.23 meq/gram was tested in the Alpha Test and found to have an Alpha Value of 33. An aliquot of this crystalline material is treated by the present method as in Example 16, except that the ferric chloride is replaced with aluminum chloride having a radius ratio of 0.386 and a size and shape which permits its entrance into the pores of the crystalline borosilicate at the temperature of 550° C. The aluminum chloride contacted crystalline material is then exchanged with 1N $NH_4NO_3$, calcined as in Example 16 and tested for catalytic activity in the Alpha Test. The treated material exhibits an Alpha Value of about 300 (compared to 33 for the untreated material).

EXAMPLE 18

A crystalline "ferrosilicate" having the structure of zeolite ZSM-5 with 1.21 wt. % $Fe_2O_3$, 105 ppm $Al_2O_3$, the balance $SiO_2$, was determined to contain approximately 24% of the Fe in framework position by ammonia sorption and temperature programmed desorption. The cation exchange capacity of this crystalline material was less than 0.7 meq/gram. An aliquot of this material was tested in the Alpha Test and found to have an Alpha Value of 1.1. A further aliquot of this material is treated by the present method as in Example 17 with aluminum chloride. The aluminum chloride contacted crystalline material is then exchanged and calcined as in Example 17 and tested for catalytic activity in the Alpha Test. The treated material exhibits an Alpha Value of about 30 (compared to 1.1 for the untreated material).

EXAMPLE 19

Solid state $^{27}Al$ MASNMR studies were carried out to substantiate the observations that the present method is new and different from ion exchange and to verify the hypothesis that aluminum activation hereby involves the insertion of $Al^{3+}$ into framework tetrahedral positions in the crystalline composition producing zeolite catalytic activity such as that present in the same zeolite or other zeolites synthesized with an initially lower $SiO_2/Al_2O_3$ mole ratio, ie. more $Al^{3+}$ originally in framework tetrahedral positions. Solid state NMR determines from the relative resonance position the coordination and environment of an element in a solid, such as the coordination of $Al^{3+}$ in a zeolite or in alumina. In alumina, $Al^{3+}$ has both tetrahedral and octahedral coordination; the octehedral $Al^{3+}$ resonance peak appears at 10 ppm relative to $Al^{3+}$ in solution and the tetrahedral $Al^{3+}$ resonance peak appears at 74 ppm.

Figure 2:
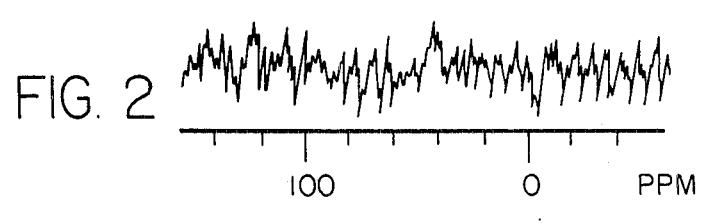
FIG. 2 of the drawings is the solid-state MASNMR spectrum of aluminum in a zeolite ZSM-5 having a silica/alumina mole ratio of 26,000, i.e. the crystalline composition of Example 1, hereinafter presented.
Figure 3:
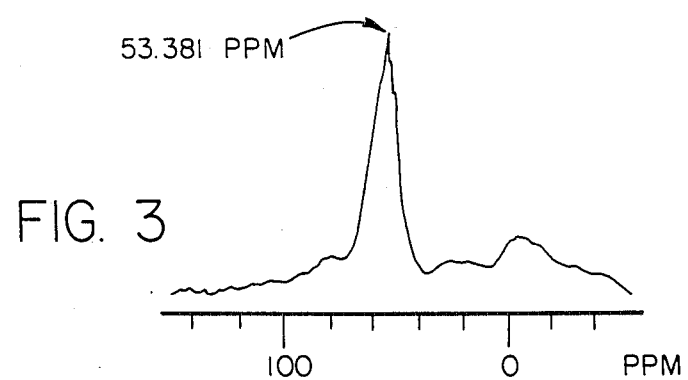
FIG. 3 of the drawings is the solid-state MASNMR spectrum of aluminum in the zeolite used for the FIG. 2 spectrum which has been treated by the present method (Example 2, hereinafter presented).

In zeolite ZSM-5 for example, only tetrahedral $Al^{+3}$ is observed. The $Al^{3+}$ resonance peak appears at 53 ppm and its intensity is proportional to the amount of tetrahedral $Al^{+3}$ present. FIG. 1 shows a typical $^{27}Al$ solid state MASNMR resonance spectrum for zeolite ZSM-5 having a $SiO_2/Al_2O_3$ mole rtio of 70; the Al resonance peak is at 53 ppm. FIG. 2 shows the resonance spectrum for the ZSM-5 composition of Example 1 having a 26,000:1 $SiO_2/Al_2O_3$ mole ratio. This spectrum was obtained at a higher sensitivity than those of FIGS. 1 and 3 in order to enhance any potential Al resonance peak. For the same spectrometer operational parameters, no Al resonance peak was observed (ie. at 53 ppm) because of the extremely low concentration of aluminum in that structure. Even with higher sensitivity, no Al resonance peak was observed for this composition. FIG. 3 shows the MASNMR spectrum of this same sample after treatment as in Example 2 in accordance with the present invention. The Al resonance peak is at 53 ppm indicative of framework tetrahedral aluminum in the treated ZSM-5. These aluminum species are generated by the present metallation procedure and their tetrahedral nature, as well as their catalytic behavior, is consistent with aluminum insertion into the lattice in tetrahedral framework sites. Ordinary ion exchange (e.g. as provided by the methods taught or suggested in U.S. Pat. Nos. 3,354,078 and 3,644,220) would result only in an increase in the octahedral Al resonance at about 10 ppm. The intensity of the $^{27}Al$ MASNMR signal for the $Al^{3+}$ activated sample (FIG. 3) is consistent with its catalytic activity (Alpha Value=100) relative to that of the as-synthesized 70 to 1 $SiO_2/Al_2O_3$ material (FIG. 1, Alpha Value=about 170).

EXAMPLE 20

To further demonstrate the present process, a 2 gram sample of calcined product from Example 9 is placed in a reactor vessel and contacted with feedstock comprised of methanol at a liquid hourly space velocity maintained at 1 $hr^{-1}$, a pressure of 1 atmosphere and a temperature of 370° C. Conversion of the methanol to hydrocarbons is measured to be over about 90%. Analysis of the product hydrocarbons from this experiment is presented in the following TABLE, values approximate.

EXAMPLE 21

The experiment of Example 20 is repeated except with the reaction temperature increased to 500° C. Here, approximately 99% of the methanol is converted to hydrocarbons. Analysis of the product hydrocarbons from this experiment is presented in the following TABLE, values approximate.

TABLE

| Product Hydrocarbons, wt. % | Example 20 | Example 21 |
|---|---|---|
| $C_1$ | 0.8 | 4.9 |
| $C_2$ | 0.1 | 0.6 |
| $C_2=$ | 10.9 | 9.8 |
| $C_3$ | 1.4 | 2.4 |
| $C_3=$ | 16.7 | 37.3 |
| $iC_4$ | 5.7 | 2.3 |
| $nC_4$ | 0.4 | 0.7 |
| $C_4=$ | 11.5 | 18.5 |
| $iC_5$ | 5.4 | 3.3 |
| $nC_5$ | 0.2 | 0.4 |
| $C_5=$ | 5.8 | 6.4 |
| $C_6^+$ non-aromatics | 28.0 | 5.7 |
| $C_6$ aromatics | — | 0.1 |
| $C_7$ aromatics | 1.0 | 0.9 |
| $C_8$ aromatics | 4.2 | 2.7 |
| $C_9$ aromatics | 4.6 | 2.3 |
| $C_{10}$ aromatics | 3.3 | 1.7 |
| $C_2=-C_5=$ | 44.9 | 72.0 |
| Aromatics | 13.3 | 7.8 |

What is claimed is:

1. A process for converting a feedstock comprising organic compounds selected from the group consisting of alcohol, carbonyl, ether and mixtures thereof to conversion product comprising hydrocarbon compounds which comprises contacting said feedstock at conversion conditions with a catalyst composition comprising a porous inorganic crystalline composition of enhanced cation exchange capacity prepared by a method for increasing the total amount of lattice metal in the framework of a porous inorganic crystalline composition comprising 98 mole percent or more $SiO_2$ and 2 mole percent or less oxides of at least one initial lattice metal selected from those of Groups IIIB, IVB, VB, VIB, VIIB, VIII, IIIA, IVA and VA of the Periodic Table of the Elements and having an anhydrous anionic framework molar composition expressed by the formula $$(1-x)SiO_2 : (x)MO_{n/2}$$

wherein x is less than or equal to 0.02, M is said initial lattice metal and n is the valance of M, which method comprises contacting said crystalline composition at a temperature of from about 100° C. to about 850° C. with a volatile compound comprising at least one metal to be coordinated in the framework of said crystalline composition for a time sufficient to increase the total amount of lattice metal in the framework of said crystalline composition wherein said total amount is greater than the amount of said initial lattice metal prior to said contacting, said volatile compound comprising said metal having a radius ratio of less than about 0.6 and a size and shape which permits said volatile compound to enter the pores of said crystalline composition at the contacting temperature, converting said volatile compound contacted inorganic crystalline composition to the hydrogen or hydronium form, and recovering said porous inorganic crystalline composition of enhanced cation exchange capacity.

2. The process of claim 1 wherein said radius ratio is greater than about 0.1.

3. The process of claim 1 wherein said conversion to hydrogen or hydronium form comprises calcining said volatile compound contacted crystalline composition at a temperature of from about 200° C. to about 600° C.

4. The process of claim 1 wherein said conversion to hydrogen or hydronium form comprises contacting said volatile compound contacted crystalline composition with an aqueous acid or ammonium salt solution thereafter calcining said material at a temperature of from about 200° C. to about 600° C.

5. The process of claim 4 wherein the ammonium salt is selected from the group consisting of ammonium nitrate, ammonium sulfate and ammonium chloride, and said acid is selected from the group consisting of acetic acid, hydrochloric acid and nitric acid.

6. The process of claim 1 wherein M is selected from the group consisting of iron, boron, chromium, aluminum and combinations thereof.

7. The process of claim 6 wherein the silica/initial lattice metal oxide mole ratio is greater than about 100.

8. The process of claim 1 wherein said crystalline composition has the structure of ZSM-5, ZSM-11, ZSM-5/ZSM-11 intermediate, ZSM-20, ZSM-48, zeolite Y or zeolite Beta.

9. The process of claim 1 wherein said volatile compound having a radius ratio of less than about 0.6 has a central atom selected from the group consisting of $Al^{+3}$, $B^{+3}$, $Be^{+2}$, $Co^{+2}$, $Cr^{+6}$, $Fe^{+3}$, $Ga^{+3}$, $Ta^{+5}$, $Mn^{+4}$, $Mo^{+6}$, $P^{+3}$, $Sb^{+3}$, $Sn^{+4}$, $Ti^{+4}$, $V^{+5}$, $W^{+6}$ and $Zr^{+4}$.

10. The process of claim 1 wherein said catalyst composition further comprises a matrix material.

11. The process of claim 10 wherein said matrix material comprises alumina.

12. The process of claim 1 wherein said conversion conditions include a temperature of from about 275° C. to about 600° C., a pressure of from about 0.5 atmosphere to about 50 atmospheres and a liquid hourly space velocity of from about 0.5 hr$^{-1}$ to about 100 hr$^{-1}$.

13. The process of claim 1 wherein said alcohol is methanol.

14. A process for converting feedstock comprising organic compounds selected from the group consisting of alcohol, carbonyl, ether and mixtures thereof to conversion product comprising hydrocarbon compounds which comprises contacting said feedstock at conversion conditions with a catalyst composition comprising a crystalline composition prepared by a method for enhancing the catalytic activity of a porous inorganic crystalline composition comprising 98 mole percent or more $SiO_2$ and 2 mole percent or less oxides of at least one initial lattice metal selected from those of Groups IIIB, IVB, VB, VIB, VIIB, VIII, IIIA, IVA and VA of the Periodic Table of the Elements and having an anhydrous anionic framework molar composition expressed by the formula $$(1-x)SiO_2 : (x)MO_{n/2}$$

wherein x is less than or equal to 0.02, M is said initial lattice metal and n is the valance of M, said crystalline composition having a total cation exchange capacity of less than about 0.7 meq/gram, which method comprises the steps of calcining said crystalline composition at a temperature of from about 200° C. to about 600° C., contacting said calcined crystalline composition at a temperature of from about 100° C. to about 850° C. with a volatile compound comprising at least one metal to be tetrahedrally coordinated in the framework of said crystalline composition for a time sufficient to increase the total amount of tetrahedrally coordinated lattice metal in the framework of said crystalline composition whereby said total amount is greater than the amount of said initial lattice metal prior to said contacting, said volatile compound comprising said metal having a radius ratio of less than 0.6 and a size and shape which permits said volatile compound to enter the pores of said crystalline composition at the contacting temperature and converting said volatile compound contacted crystalline composition to the hydrogen or hydronium form.

15. The process of claim 14 wherein said conversion to hydrogen or hydronium form comprises calcining said volatile compound contacted crystalline composition at a temperature of from about 200° C. to about 600° C.

16. The process of claim 14 wherein said conversion to hydrogen or hydronium form comprises contacting said volatile compound contacted crystalline composition with an aqueous acid or ammonium salt solution and thereafter calcining said material at a temperature of from about 200° C. to about 600° C.

17. The process of claim 16 wherein said ammonium salt is selected from the group consisting of ammonium nitrate, ammonium sulfate and ammonium chloride, and said acid is selected from the group consisting of acetic acid, hydrochloric acid and nitric acid.

18. The process of claim 14 wherein M is selected from the group consisting of iron, boron, chromium, aluminum, and combinations thereof.

19. The process of claim 18 wherein the silica/initial lattice metal oxide mole ratio is greater than about 100.

20. The process of claim 14 wherein said crystalline composition has the structure of ZSM-5, ZSM-11, ZSM-5/ZSM-11 intermediate, ZSM-20, ZSM-48, zeolite Y or zeolite Beta.

21. The process of claim 14 wherein said volatile compound having a radius ratio of less than about 0.6 has a central atom selected from the group consisting of $Al^{+3}$, $B^{+3}$, $Be^{+2}$, $Co^{+2}$, $Cr^{+6}$, $Fe^{+3}$, $Ga^{+3}$, $Ta^{+5}$, $Mn^{+4}$, $Mo^{+6}$, $P^{+3}$, $Sb^{+3}$, $Sn^{+4}$, $Ti^{+4}$, $V^{+5}$, $W^{+6}$ and $Zr^{+4}$.

22. The process of claim 14 wherein said catalyst composition further comprises a matrix material.

23. The process of claim 22 wherein said matrix material comprised aluminum.

24. The process of claim 14 wherein said conversion conditions include a temperature of from about 275° C. to about 600° C., a pressure of from about 0.5 atmosphere to about 50 atmospheres and a liquid hourly space velocity of from about 0.5 $hr^{-1}$ to about 100 $hr^{-1}$.

25. The process of claim 14 wherein said alcohol is methanol.

* * * * *